A. W. HEINLE.
JOINT.
APPLICATION FILED APR. 19, 1912.

1,054,843.

Patented Mar. 4, 1913.

WITNESSES
R A Balderson

INVENTOR
A. W. Heinle
by Bakewell Byrnes & Parmelee
his attys

A. W. HEINLE.
JOINT.
APPLICATION FILED APR. 19, 1912.

1,054,843.

Patented Mar. 4, 1913.

WITNESSES
R A Balderson
W Famariss

INVENTOR
A W Heinle
by Bakewell Byrnes Parmelee
his attys

UNITED STATES PATENT OFFICE.

ALBERT W. HEINLE, OF CRAFTON, PENNSYLVANIA, ASSIGNOR OF ONE-HALF TO JAMES L. HORNING, OF MOUNT LEBANON, PENNSYLVANIA.

JOINT.

1,054,843.  Specification of Letters Patent.  Patented Mar. 4, 1913.

Application filed April 19, 1912. Serial No. 691,899.

*To all whom it may concern:*

Be it known that I, ALBERT W. HEINLE, a resident of Crafton, in the county of Allegheny and State of Pennsylvania, have invented a new and useful Improvement in Joints, of which the following is a full, clear, and exact description, reference being had to the accompanying drawings, forming part of this specification, in which—

Figure 1 is a sectional view showing one form of my invention. Fig. 2 is a side view of the joint shown in Fig. 1. Figs. 3, 4 and 5 are views similar to Fig. 1, but showing different embodiments of my invention. Fig. 6 is a side view of the joint shown in Fig. 4. Fig. 7 is a side view showing another arrangement of the joint bolts. Fig. 8 is a side view of the joint shown in Fig. 5. Fig. 9 is an end view showing still another modification, and Figs. 10 and 11 are detail side or plan views of different forms of bolting blocks which may be employed.

My invention has relation to joints for beams, girders, rails, etc., being generally applicable to the construction of joints between members of general I-beam, or double flanged shapes.

The object of my invention is to provide a joint having a novel arrangement of the joint bolts, whereby a better and more efficient hugging action of the fishing surfaces of the joint may be obtained, and which also possesses other advantages some of which will hereinafter appear.

My invention consists broadly in a joint in which the fastening bolts are placed at an oblique angle to the vertical plane of the joined members, the splice or joint bars having outer bolting faces which are at right angles to the longitudinal axes of the bolt, such outer faces being formed either integrally with the splice bars or porvided by means of separate bolting blocks seated between the bolt heads or nuts and the outer faces of the bars proper.

My invention will be best understood by reference to the accompanying drawings, in which I have shown a number of different embodiments thereof, and which will now be described, it being premised, however, that the invention is susceptible of other embodiments within the spirit and scope of the appended claims.

Referring first to that form of my invention which is shown in Figs. 1 and 2, the numeral 2 designates the joined members of the joint, which, in this case, are shown as consisting of I-beams.

3 and 4 designate splice bars which are applied to opposite sides of the members 2 across the joint, and which are secured by means of the joint bolts 5 and 6. These bolts are placed at oblique angles to the vertical planes of the members 2, the bolts 6 being at reverse angles to the bolts 5, so that the longitudinal axes of the two sets of bolts cross each other. In the form shown in these two figures, the two bolts 5 and 6 of each pair of bolts pass through a single opening 7 formed through the web of one of the members 2.

When the bolts 5 are tightened it will be readily seen that they draw inwardly on the bottom portions of the splice bars 4, the latter fulcruming on the under side of the top flange of the member 2; and also draw inwardly upon the upper portion of the splice bar 3, whose lower portion fulcrums on one of the bottom flanges of the member 2. In this manner the tops and bottoms of the splice bars are drawn inwardly in a somewhat radial manner, which will relieve binding at the points *a* and provide for inward escape for the binding or spring action of the bars. This promotes a hugging or close fitting action of the fishing surfaces of the joint to an extent which is not present in the ordinary forms of joints.

In Fig. 3, I have shown my invention as applied to members of deep section, specifically deep girder rails. In this form of my invention, I provide two sets of the bolts 5 and 6, one set being above the horizontal axis of the girder members while the other set is below said axis. The splice bar members 8 and 9 are each provided with a central inward projection 10 which bears against the web of the girder. These projections give the splice bar members 8 and 9 an intermediate fulcrum, so that as the bolts are tightened, the fishing surfaces of the said members are very efficiently engaged with the fishing surfaces of the girder members.

Figs. 4 and 6 show a form of invention which is similar to that shown in Figs. 1 and 2 except that instead of arranging the bolts 5 and 6 in pairs and causing the bolts of each pair to extend through a single hole of the web of the intermediate member, said bolts are placed in staggered relations, and a separate hole is provided for each bolt.

Figure 9:
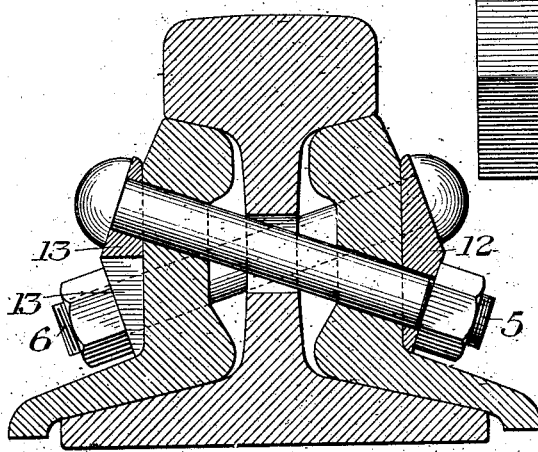
Figure 10:
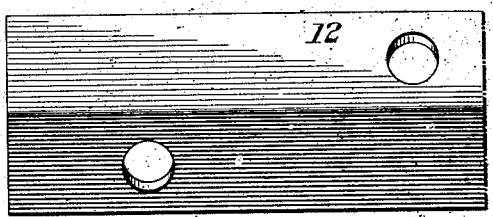
Figure 11:
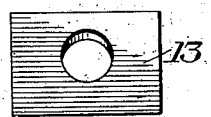

In Fig. 9, these right-angled bolting-faces are provided by means of separate bolting blocks interposed between the heads and nuts of the bolts and the outer faces of the splice bars. For this purpose I may use single blocks 12 for each pair of bolts, said blocks having oppositely beveled outer faces, or a separate block 13 may be used for each bolt. These bolting blocks may be used in any of the forms of my invention in lieu of the provision of the integrally formed right-angled bolting faces; and in the appended claims, wherever reference is made to splice bars having bolting faces at right-angles to the longitudinal axes of the bolts, it is to be understood that said bolting faces may be either integral with or separate from the bars.

The diagonal stresses which are exerted at intervals along the splice bars and the stresses converging about a neutral axis through the intermediate member or web, tends to cause a very slight twisting in the splice bars which very greatly facilitates their being properly drawn up to their seats.

Figure 7:
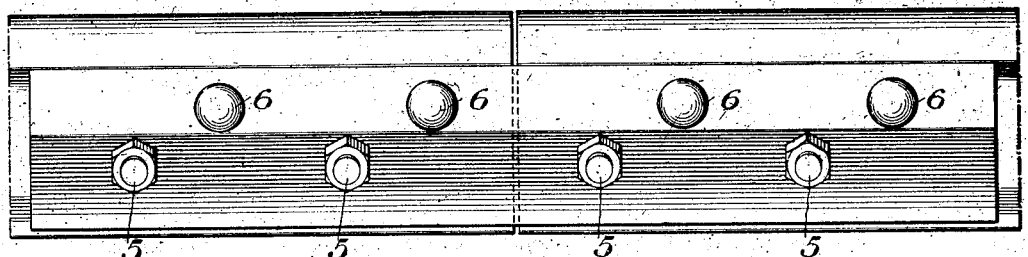
Fig. 7 shows the two series of bolts 5 and 6 arranged in pairs with separate holes through the webs of the intermediate members. In all of the forms thus far described, the outer faces of the splice bar members are formed with opposite bevels or inclines so as to provide bolting faces for the nuts and heads of the bolts which are at right angles to the longitudinal axes of the bolts.
Figure 8:
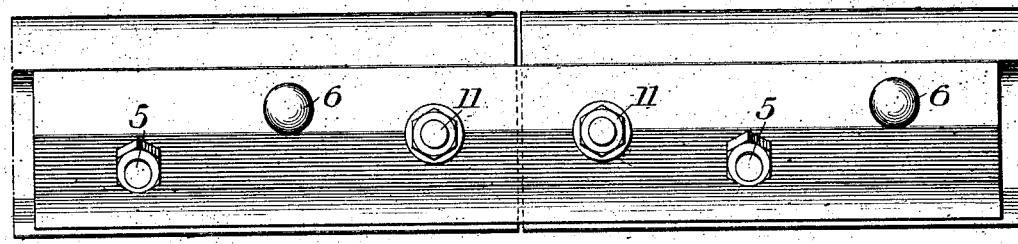

My invention also enables the use of bolts of smaller diameter than are ordinarily employed, this being due to the inward springing action of the splice bars which tends to largely relieve diagonal and transverse strains, and also due to the fact that the longitudinal axes of the bolts approach lines which are more nearly those of the vertical legs of the splice bars. With smaller bolts, relatively smaller bolt holes can be used in the splice bars, thus increasing their strength and greatly assisting them in resisting upward and downward stresses under a moving load. A larger number of these smaller bolts can be placed closely together, as shown in Fig. 7, without weakening the bar.

My invention also enables the use of ordinary forms of vertical leg splice bars, and bolting blocks which can be rolled in long lengths and cut into multiples to suit. The bolt holes being symmetrically arranged, the bars can be used reversibly at either side of the joint. The modern tendency is toward the use of beam or girder members of increasing depth; and with every increase in the distance between the fishing surface the greater is the advantage which can be obtained with my improved bolt arrangement.

Figure 1:
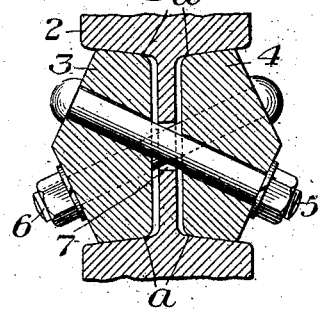
Figure 2:
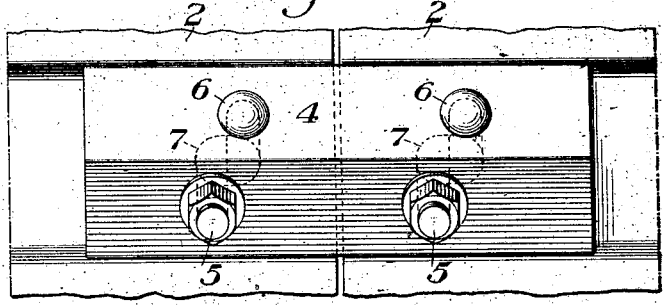
Figure 3:
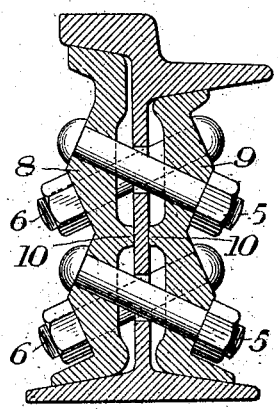
Figure 4:
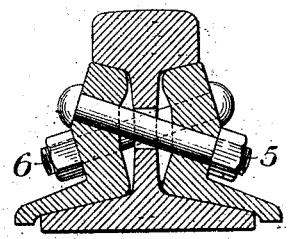
Figure 5:
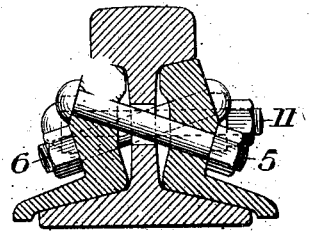
Figs. 5 and 8 show a form of the invention also similar to that shown in Fig. 1, with the addition of two central horizontal joint bolts 11.
Figure 6:
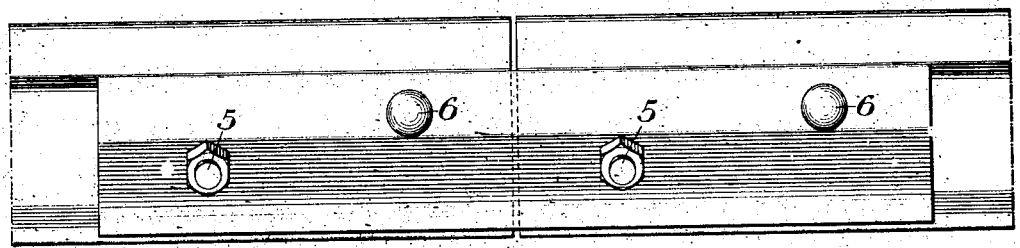

I prefer to so seat the bolts that their threaded ends will be downwardly, especially with I-beam sections, as in the form shown in Fig. 1, since by such arrangement the engagement of the nuts by means of a wrench is greatly facilitated.

I claim:

1. A joint having its fastening bolts placed at an oblique angle to the horizontal plane of the joint, adjacent bolts being at reverse angles; substantially as described.

2. A joint having its fastening bolts placed at oblique angles to the horizontal plane of the joint, the joint having its splice bar members provided with at least two outer bolting faces at right angles to the longitudinal axes of the bolts; substantially as described.

3. A joint having its fastening bolts placed at an angle to the horizontal plane of the joint, adjacent bolts being at reverse angles, and the adjacent bolts of each pair passing through a single hole in the intermediate member of the joint; substantially as described.

4. In a joint for girder sections, the combination with the sections, of splice bars applied to opposite sides thereof, each of said splice bars having its inner face formed with a fulcrum projection for engagement with the webs of the girder members, and joint bolts arranged above and below said fulcrum projections; said bolts having their axes at oblique angles to the horizontal plane of the joint; substantially as described.

5. In a joint for girder sections, the combination with the sections, of splice bars applied to opposite sides thereof, each of said splice bars having its inner face formed with a fulcrum projection for engagement with the webs of the girder members, and joint bolts arranged above and below said fulcrum projections, said bolts having their axes at oblique angles to the horizontal plane of the joint, adjacent bolts being at reverse angles; substantially as described.

6. In a joint for girder sections, the combination with the sections, of splice bars applied to the opposite sides thereof, said splice bars having fulcrums at their upper and lower edges for engagement with the flanges of the girder members, and staggered joint bolts arranged above and below the center of the splice bars, said bolts being arranged to spring the bars on irregular lines; substantially as described.

In testimony whereof, I have hereunto set my hand.

ALBERT W. HEINLE.

Witnesses:
JESSE B. HELLER,
H. M. CORWIN.